US008772380B2

(12) United States Patent
Vaidya et al.

(10) Patent No.: US 8,772,380 B2
(45) Date of Patent: *Jul. 8, 2014

(54) PERFORMANCE GRADED SULFUR MODIFIED ASPHALT COMPOSITIONS FOR SUPER PAVE COMPLIANT PAVEMENTS

(75) Inventors: Milind M. Vaidya, Dhahran (SA);
Anwar H. Khawajah, Dammam (SA);
Rashid M. Othman, Khobar (SA);
Laurand Lewandowski, Tampa, FL (US)

(73) Assignee: Saudi Arabian Oil Company, Dhahran (SA)

( * ) Notice: Subject to any disclaimer, the term of this patent is extended or adjusted under 35 U.S.C. 154(b) by 543 days.

This patent is subject to a terminal disclaimer.

(21) Appl. No.: 12/938,812

(22) Filed: Nov. 3, 2010

(65) Prior Publication Data

US 2012/0108708 A1    May 3, 2012

(51) Int. Cl.
*C08L 95/00* (2006.01)

(52) U.S. Cl.
USPC .................. 524/59; 524/60; 524/68; 524/69; 524/70; 524/71

(58) Field of Classification Search
USPC ......................................... 524/59, 60, 61–71
See application file for complete search history.

(56) References Cited

U.S. PATENT DOCUMENTS

| | | | |
|---|---|---|---|
| 4,155,654 | A | 5/1979 | Kennepohl et al. |
| 4,211,575 | A | 7/1980 | Burris |
| 4,311,826 | A | 1/1982 | McBee et al. |
| 4,339,277 | A | 7/1982 | Schult |
| 4,412,019 | A | 10/1983 | Kraus |
| 4,750,984 | A | 6/1988 | Ott |
| 4,756,763 | A | 7/1988 | Etnyre |
| 4,769,288 | A | 9/1988 | Saylak |
| 5,382,612 | A | 1/1995 | Chaverot et al. |
| 5,508,112 | A | 4/1996 | Planche et al. |
| 5,618,862 | A | 4/1997 | Germanaud et al. |
| 5,750,598 | A | 5/1998 | Krivohlavek et al. |
| 5,773,496 | A | 6/1998 | Grubba |
| 5,795,929 | A | 8/1998 | Grubba |
| 5,880,185 | A | 3/1999 | Planche et al. |
| 6,011,094 | A | 1/2000 | Planche et al. |
| 6,011,095 | A | 1/2000 | Planche et al. |
| 6,429,241 | B1 | 8/2002 | Liang |
| 6,440,205 | B1 | 8/2002 | Bailey et al. |
| 6,802,897 | B1 | 10/2004 | Lackey et al. |
| 6,824,600 | B2 | 11/2004 | Bailey et al. |
| 6,863,724 | B2 | 3/2005 | Bailey et al. |
| 2006/0089429 | A1* | 4/2006 | Buras et al. ............... 524/59 |
| 2007/0287778 | A1* | 12/2007 | Martin ....................... 524/59 |
| 2009/0068348 | A1* | 3/2009 | Reinke et al. ............. 427/138 |
| 2009/0194002 | A1 | 8/2009 | Maldonado et al. |

FOREIGN PATENT DOCUMENTS

| | | |
|---|---|---|
| CA | 755999 A | 4/1967 |
| WO | 01/90250 | 11/2001 |
| WO | 2006/107907 | 10/2006 |
| WO | 2008/132151 | 11/2008 |
| WO | 2009/033060 | 3/2009 |
| WO | 2009/105688 | 8/2009 |

OTHER PUBLICATIONS

Jirak, Jeff A., et al. "Road Evaluation Report," DuPont Elvaloy reactive elastomeric terpolymer (RET) Oct. 14, 2000, 1-9, DuPont Industrial Polymers, Wilmington, DE.
"Build Safer, longer-lasting pavements that fight extreme temperatures and traffic loads," http://www.dupont.com/asphalt/, Jul. 20, 2006, 1-3, DuPont Industrial Polymers, Wilmington, DE.
Edwards, Y., et al. "Rheological effects of commercial waxes and polyphosphoric acid in bitumen 160/220—high and medium temperature performance," Construction and Building Materials, 2007, 1899-1908, 21 (available online Sep. 20, 2006).
Edwards, Y., et al. "Rheological effects of commercial waxes and polyphosphoric acid in bitumen 160/220—low temperature performance," Fuel, 2006, 989-997, 85 (available online Oct. 24, 2005).
Jin, Hailong, et al. "Improved properties of polystyrene-modified asphalt through dynamic vulcanization," Polymer Testing, 2002, 633-640, 21.
Saleem, Junaid. "Sulfur Modification of Polymers for Use in Asphalt Binders," A Thesis Presented to the Deanship of Graduate Studies, King Fahd University of Petroleum and Minerals, Jun. 2008.
Timm, David, et al. "Evaluation of Mixture Performance and Structural Capacity of Pavements Using Shell Thiopave," National Center for Asphalt Technology at Auburn University, Aug. 2009, 1-91, NCAT Report 09-05.
Masson. "Brief Review of the Chemistry of Polyphosphoric Acid (PPA) and Bitumen," Energy & Fuels, 2008, 2637-2640, 22.
Hurley, Graham C., et al. "Evaluation of Sasobit for Use in Warm Mix Asphalt," National Center for Asphalt Technology, June 20051-27, NCAT Report 05-06.
"Dupont Elvaloy Research Report," Mathy Technology & Engineering Services, Inc., Oct. 16, 2001, pp. 1-38, Retrieved from the Internet: URL:http://www2.dupont.com/Asphalt_Modifier/en_US/assets/downloads/Citgo-RET-vs-SBS-Mathy.pdf [retrieved on Feb. 3, 2012].
"Asphalt Modifier-Elvaloy RET," E.I. du Pont de Memours and Company, 2012, p. 1, Retrieved from the Internet: URL:http://www2.dupont.com/Asphalt_Modifier/en_US/index.html [retrieved on Feb. 3, 2012].
Carswell, J., et al. "Dynamic shear Rheometers," Dec. 29, 2004, Retrieved from the Internet: URL:http://www2.dupont.com/Asphalt_Modifier/en_US/assets/downloads/Citgo-RET-vs-SBS-Mathy.pdf [retrieved on Feb. 2, 2012].

(Continued)

*Primary Examiner* — Peter D Mulcahy
(74) *Attorney, Agent, or Firm* — Bracewell & Giuliani LLP; Constance G. Rhebergen; James M. Sellers

(57) ABSTRACT

Disclosed herein are an asphalt concrete mixture, an asphalt binder composition, and methods of preparing the related compositions. The asphalt binder compositions include a polyphosphoric acid, a macromolecular polymer having a saturated backbone with macromolecular modifications, and sulfur. The compositions are capable of being performance graded.

33 Claims, 4 Drawing Sheets

(56) References Cited

OTHER PUBLICATIONS

PCT International Search Report dated Feb. 27, 2012, International Application No. PCT/US2011/059108.
"Section 5: Hot Mix Asphalt Concrete Pavement Mixturs" Pavement Design Guide, Chapter 3, Texas Department of Transportation, http://onlinemanuals.txdot.gov/txdotmanuals/pdm/hot_mix_asphalt_concrete_pavement_mixtures.htm, Jan. 1, 2011, 9 pages.
Notice of Allowance for co-pending U.S. Appl. No. 12/938,984 dated Dec. 31, 2013.

* cited by examiner

PERFORMANCE GRADED SULFUR MODIFIED ASPHALT COMPOSITIONS FOR SUPER PAVE COMPLIANT PAVEMENTS

FIELD OF THE INVENTION

Disclosed herein are an asphalt concrete mixture, an asphalt binder composition, and methods of preparing the asphalt concrete mixture.

BACKGROUND OF THE INVENTION

As modern commerce depends on reliable and cost-effective methods for delivering products from suppliers to users, the availability of durable and reliable highways, roads and other support surfaces for vehicles is vital for sustaining a modern economy. To provide better support surfaces, highways, roads, and sidewalks are commonly paved with an asphalt concrete that is laid over the surface of the sub-base. Asphalt concrete cement is preferred over Portland Cement Concrete to pave roads because it is less expensive and very durable. Asphalt hot mix can also be constructed at night, which allows major roads to be shut down at the least busy of times for maintenance. Relative to road noise, asphalt is also quieter than Portland Cement Concrete, making it the better choice for roads.

Asphalts are essentially mixtures of bitumen, as binder, with aggregate, in particular coarse and fine aggregate and mineral fillers. There are many different types of asphalts available and their characteristics can vary quite significantly. The design of asphalts for bituminous paving application is a complex process of selecting and proportioning materials to obtain the desired properties in the finished construction while minimize undesirable characteristics.

In evaluating the development of proper mix designs, the aggregate gradation, binder content, and compaction effect are critical in obtaining a hot mix asphalt that performs according to the requirements. The final goal of mix design is to achieve a balance among all of the desired properties. Both unmodified and polymer modified asphalt binders have been investigated for to help achieve the desired performance properties in the hot mix asphalt, such as resistant to permanent deformation, resistance to low temperature thermal cracking and resistance to fatigue cracking.

Unsaturated thermoplastic elastomers like styrene-butadiene-styrene (SBS) block copolymers are polymers used for asphalt modification. They enhance the elastic recovery capacities of asphalt and, therefore, its resistance to permanent deformations. However, unsaturated elastomeric polymers are quite expensive and are subjected to degradation when exposed to atmospheric agents and mechanical stress. This can result in a significant cost increase for the product. While SBS is recognized for performance benefits, research has focused on most cost effective modifiers in exchange for sacrificing superior performance.

Olefinic polymers have been investigated for use as modifiers. They are available in large quantities with different rheological properties and at low cost. Polyethylene (PE) and polypropylene (PP) are plastomers. They bring a high rigidity (i.e., lack of elasticity, resistance to bending) to the product and significantly reduce deformations under traffic load. Due to their chemical and structural make-up, PE and PP suffer from the drawback that they are almost completely immiscible with asphalt, and are thus limited in use.

Unmodified asphalts will flow at high temperature and are limited with respect to certain road applications. The characteristics of road asphalts can be improved by incorporating of elastomeric-type polymers. There exists a wide variety of polymers that can be mixed with asphalt. Of these, SBS is a commonly used polymer in asphalt modification. The modified asphalts thus obtained commonly are referred to variously as bitumen/polymer binders or asphalt/polymer mixes. There is a need for a modification to hot mix asphalt concrete mixes that would increase the resistance to permanent deformation at high temperatures while improving the modulus of the mix at intermediate temperatures without affecting the binder properties significantly to improve the fatigue properties.

The bituminous binders, even of the bitumen/polymer type, which are employed at the present time in road applications often, do not have the optimum characteristics at low enough polymer concentrations to consistently meet the increasing structural and workability requirements imposed on roadway structures and their construction. In order to achieve a given level of modified asphalt performance, various polymers are added at some prescribed concentration. It is common practice to use a cross-linking agent, such as sulfur, to compatibilize polymer in the asphalt and help improve the properties. The sulfur in these cases is added in a range of about 3-5 wt. % based on the polymer. When sulfur is added at a loading greater than several weight percentage, then it is considered a modifier.

When added to bitumen at 140° C., sulfur is finely dispersed in bitumen as uniformly small particles; coagulation and settlement of sulfur particles become noticeable after a few hours. Therefore, the sulfur extended asphalt (SEA) mixtures can be produced directly in the mixing plant just before the laying of the asphalt mixture. One major concern in handling sulfur-asphalt mix is the fear of the evolution of hydrogen sulfide ($H_2S$) during production and laying. This problem can be ameliorated by adding carbon or ash to sulfur. $H_2S$ evolution starts at temperatures higher than 150° C., so that the application at temperatures up to 150° C. avoids pollution and safety problems. However, $H_2S$ evolution starts well below 150° C., i.e. about 130° C. Also, higher loadings of sulfur cannot be used in conjunction with unsaturated polymers, such as SBS, SB and SBR because of the formation of gel and gross incompatibility.

Besides concerns related to emissions, sulfur modified asphalt compositions have not able to be super pave performance graded (PG). The unreacted sulfur in the past tended to cause embrittlement upon aging. Earlier reported sulfur asphalt binders did not report on improving the grading of the asphalt over an unmodified control at both the high temperature and low temperature regions.

A need exists for asphalt compositions that can be performance grade. It would be advantageous if the compositions could include materials, such as sulfur, that enhance performance of the compositions, while being relatively inexpensive.

SUMMARY OF THE INVENTION

In view of the foregoing, asphalt concrete compositions, asphalt binder compositions, and methods of preparing the compositions are provided as embodiments of the present invention. The compositions of the present invention are capable of being performance graded. The asphalt binder compositions generally include a polyphosphoric acid, a macromolecular polymer having a saturated backbone with macromolecular modifications, and sulfur. In an aspect, the sulfur can be elemental sulfur or any form whether in powder form, slurry, or crystallized in the orthorhombic form. The binder can be added to asphalt concrete to produce the asphalt concrete compositions.

An asphalt concrete composition having high sulfur load with improved properties relative to high temperature rotational viscosity without a reduction in dynamic shear properties is provided as an embodiment of the present invention. In this embodiment, the asphalt concrete composition includes a polyphosphoric acid, a macromolecular polymer having a saturated backbone with macromolecular modifications, sulfur, and an asphalt concrete. Polyphosphoric acid can have the empirical formula $P_qH_rO_s$ in which q, r, and s are positive numbers such that q is greater or equal to 2 and preferably ranges from 3 to 20. Any linear compound of the empirical formula $P_qH_{q+2}O_{3q+1}$ or polyphosphoric acids that can be polycondensation products formed from heating of metaphosphoric acid can be used in embodiments of the present invention. In an aspect, the sulfur can be elemental sulfur or any form whether in powder form, slurry, or crystallized in the orthorhombic form. In an aspect, the asphalt concrete includes aggregate and bitumen.

The amounts of each component contained within the asphalt concrete composition can be varied. The polyphosphoric acid can be present in an amount effective to provide sufficient formation of improved high stiffness properties. The macromolecular polymer can be present in an amount effective to increase viscosity of the composition so that it can be used in warm mix applications. Any polymer with a saturated hydrocarbon backbone, with or without reactive functionality can be used in embodiments of the present invention. Polymers formed from the monomers of ethylene, propylene, acrylate, butyacrylates, butylenes, hexenes, octenes, acrylate, butyacrylates, butylenes, etc.; long chain branched polyolefins with octenes; polyolefins graft or/or block/or diblock/or triblock polymers with maleic anhydride, fumarate and maleate esters, (meth)acrylate esters [e.g. glycidyl methacrylate and hydroxethyl methacrylate] and (meth)acrylic acid; polyolefin elastomers containing reactive p-methylstyrene groups, such as poly(isobutylene-co-p-methylstyrene)elastomers; or combinations thereof can be used in embodiments of the present invention. The sulfur can be present in an amount effective to at least partially emulsify in the composition. The addition of sulfur under high shear in compositions of the present invention allows the sulfur to basically emulsify to some degree in the asphalt. The use of high shear allows for complete dispersion of the sulfur at a loading where all the sulfur is soluble and does not come out of solution.

As another embodiment of the present invention, a highly loaded sulfur-modified asphalt binder composition for use with asphalt concrete for improved properties relative to high temperature rotational viscosity without a reduction in dynamic shear properties is provided. In this embodiment, the binder includes a polyphosphoric acid, a macromolecular polymer having a saturated backbone with macromolecular modifications, and sulfur. In an aspect, the sulfur can be elemental sulfur or any form whether in powder form, slurry, or crystallized in the orthorhombic form.

The amounts of the components of the binder composition can vary. For example, the polyphosphoric acid is present in a range of about 0 wt. % to about 2.0 wt. % to provide sufficient enhancement of the high temperature properties. As another example, the macromolecular polymer having a saturated backbone with macromolecular modifications is present in a range of about 0 wt. % to about 5 wt. % to increase viscosity of the binder so that it can be used in warm mix applications. The use of polymer modified asphalt binders requires higher processing temperature not making it suitable for warm mix applications due to the reduction of the high temperature viscosity. The sulfur is present in an amount effective to at least partially emulsify in the composition. Other suitable amounts of each component will be apparent to those of skill in the art and are to be considered within the scope of the present invention.

Besides the compositional embodiments, methods of preparing the asphalt composition are also provided as embodiments of the present invention. In an embodiment, a method of preparing an asphalt concrete composition having high sulfur load with improved properties relative to high temperature rotational viscosity without reduction in dynamic shear properties is provided.

In an embodiment, a binder composition is prepared that includes a polyphosphoric acid, a macromolecular polymer having a saturated backbone with macromolecular modifications, and sulfur. In an aspect, the sulfur can be elemental sulfur or any form whether in powder form, slurry, or crystallized in the orthorhombic form. The polyphosphoric acid is present in an amount effective to provide sufficient high temperature stiffness. The sulfur is present in an amount effective to at least partially emulsify in the composition. Once the binder has been prepared, it is combined with asphalt concrete to produce the asphalt concrete composition. As with other embodiments, the asphalt concrete includes aggregate and bitumen.

The compositional embodiments of the present invention are compliant to Performance Grade of asphalts and improves the grading of the asphalt over an unmodified control at both the high temperature and low temperature regions. The binder compositions of the present invention can be used as a lower cost alternative to polymer modified binders in asphalt pavement applications. The compositions of the present invention can be used in paving applications.

Embodiments of the present invention include sulfur-modified asphalt compositions that perform as an asphalt binder in paving applications. The binder composition embodiments allow the compositions of the present invention to be performance graded and improve the grading of the asphalt over an unmodified control at both the high temperature and low temperature regions, which significantly enhances the both low and higher temperature applications range in which the compositions can be used, particularly in pavement construction applications.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above can be had by reference to the embodiments thereof that are illustrated in the drawings that form a part of this specification. It is to be noted, however, that the appended drawings illustrate some embodiments of the invention and are, therefore, not to be considered limiting of the invention's scope, for the invention can admit to other equally effective embodiments.

DETAILED DESCRIPTION OF THE INVENTION

Figure 1:
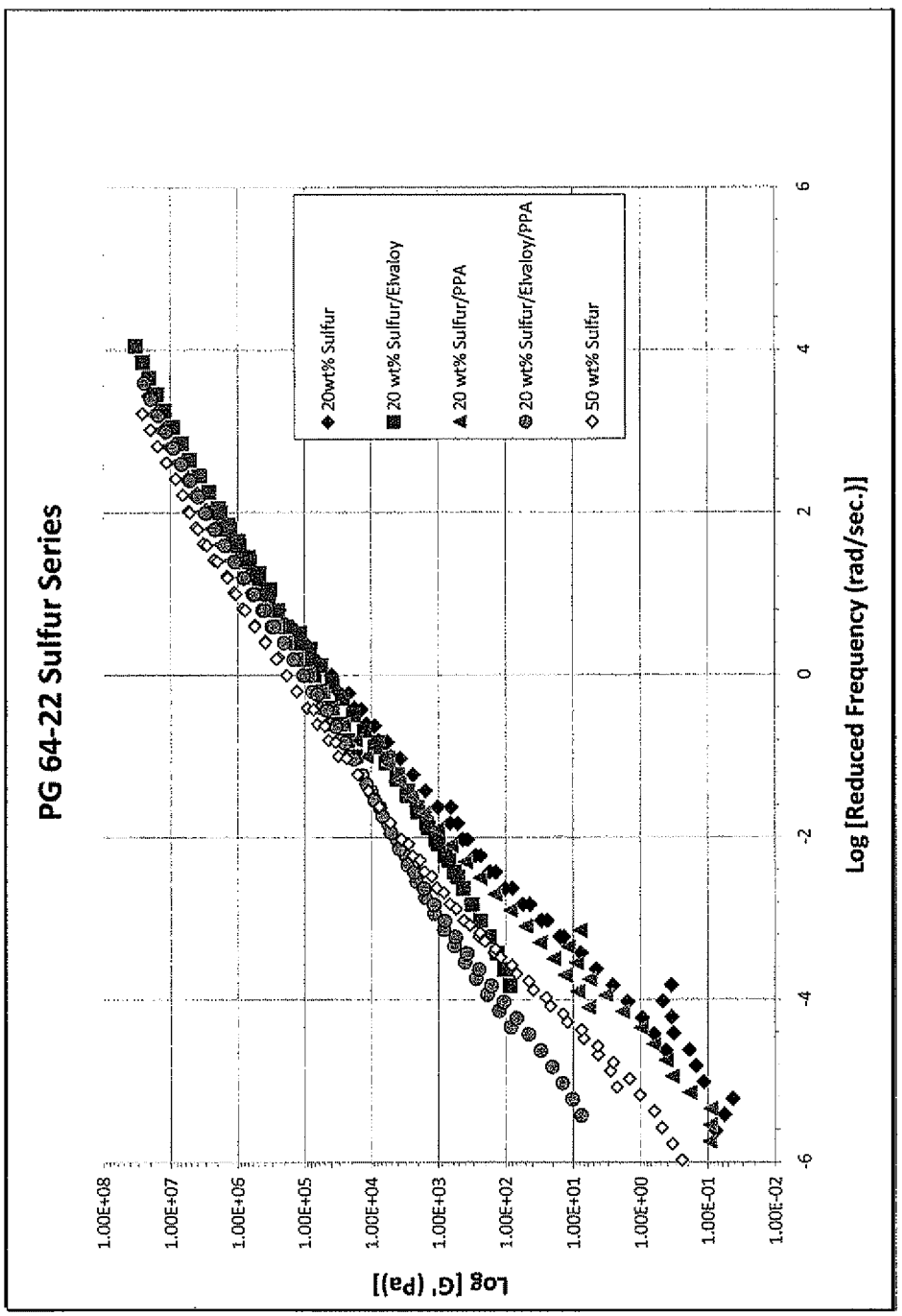
FIG. 1 is a graphical representation of a time-temperature superposition of the log modulus (G') versus the log reduced frequency comparing a composition with and without inclusion of a high sulfur load in accordance with embodiments of the present invention as described in Example 1.

It is desirable for asphalt concrete, including asphalt and aggregate, asphalt compositions for resurfacing asphalt concrete, and similar asphalt compositions to exhibit a certain number of specific mechanical properties to enable their use in various fields of application, especially when the asphalts are used as binders for superficial coats (road surfacing), as asphalt emulsions, or in industrial applications. As used herein, the term "asphalt" can be used interchangeably with "bitumen." As used herein, "asphalt concrete" is generally asphalt used as a binder with appropriate aggregate added, typically for use in roadways. The use of asphalt or asphalt emulsion binders either in surface treatments or thin lift overlay, or as a thicker structural layer of bituminous mix in asphalt concrete, is enhanced if these binders possess the requisite properties such as desirable levels of performance with respect to temperature and loading.

The general method used to grade asphalt binder is AASHTO M320, where AASHTO stands for the American Association of State Highway Transportation Officials. The Performance Grading has numerous steps which simulate what the asphalt binder will be exposed to during processing and subsequent field use. For example, Rolling Thin Film Oven (RTFO) and Pressure Aging Vessel (PAV) studies are used to simulate binder aging (hardening) characteristics. Dynamic Shear Rheometers (DSR) are used to measure binder properties at high and intermediate temperatures. This is used to predict permanent deformation or rutting and fatigue cracking. The RTFO DSR is used to indicate if a binder has sufficient strength to resistance permanent deformenation (minimum rutting resistance as defined as a "G*/sin δ" over 2.20 kPA and measured by a dynamic shear rheometer (DSR)). Resistance fatigue cracking is measured by aging the binder in the Pressure Aging Vessel and looking at the resulting G*/sin δ properties using the Bending Beam Rheometers (BBR). A BBR is used to measure binder properties at low temperatures. This method is used to measure the binders stiffness and flexibility at low temperatures and related to the binder's resistance to have low temperature thermal cracking.

Asphalt grading is given in accordance with accepted standards in the industry, such as PG 64-22, where PG stands for Performance Grade and 64 is related to the higher temperature in degrees Celsius and −22 is the low temperature in degrees Celsius.

As indicated previously, asphalt concrete includes asphalt combined with aggregates in various rations, one exemplary ration being approximately 92 parts by weight of aggregate (coarse, fine and mineral filler) approximately 5 parts by weight of liquid asphalt and the rest being composed of air voids. Other suitable amounts of aggregates and bitumen can be used, as will be apparent to those of skill in the art, and are to be considered within the scope of the present invention. The asphalt cement is used to bind together the aggregate material and limit its mobility when a load is applied. The aggregate is prepared in a matter to have certain amount of fracture faces and when mixed in the proportion according to the Job Mix Formula and mixed with the liquid asphalt and compacted to the required density form a Hot Mix Asphalt pavement.

Elastic modulus, which is sometimes called Young's modulus, is a property that is often used to determine if an asphalt composition is suitable for a particular application. Elastic modulus (E) can be determined for a solid material and represents a constant ratio of stress and strain (a stiffness): E=stress/strain. A material is elastic if it is able to return to its original shape or size immediately after being stretched or squeezed. Almost all materials are elastic to some degree as long as the applied load does not cause it to deform permanently. Thus, the "flexibility" of any object or structure depends on its elastic modulus and geometric shape. The modulus of elasticity for a material is basically the slope of its stress-strain plot within the elastic range.

Asphalt has been the subject of exhaustive study to improve characteristics for use in paving. Various properties of asphalt are manipulated to produce a product that has the appropriate wear properties, rut resistance, fatigue and low temperature cracking resistance, adhesion strength, and viscosity. Rut resistance is resistance to longitudinal surface depressions in the wheel paths. Asphalt can be any asphaltic product formed from the atmospheric and vacuum distillation of crude oil, natural asphalt (Gilsonite®, Trinidad Lake Asphalt, Shale Oil derived or tar sands.) and can be hard asphalt, blown asphalt, stiff refined asphalt, or a flux. Asphalt can also be generated as a stream from ROSE process, solvent deasphalting. Asphalt is usually the base ingredient for the primer and the binder. Besides the asphalt binder, other materials, such as fibers (including but not limited to, mineral or cellulose), processing agent (including but not limited to, oligiomeric wax, carboxilated, derivative of oligiomeric wax, or low molecular weight polyolefins), polymeric or elastomeric additive, or asphalt-derived. A primer melts to the aggregate. Asphalt binders without polymers are referred to as "neat".

In view of the foregoing, asphalt concrete compositions, asphalt binder compositions, and methods of preparing the compositions are provided as embodiments of the present invention. The asphalt binder compositions generally include a polyphosphoric acid, a macromolecular polymer having a saturated backbone with macromolecular modifications, and an sulfur. In an aspect, the sulfur can be elemental sulfur or any form whether in powder form, slurry, or crystallized in the orthorhombic form.

An asphalt concrete composition having high sulfur load with improved properties relative to high temperature rotational viscosity without a reduction in dynamic shear properties is provided as an embodiment of the present invention. In this embodiment, the asphalt concrete composition includes a polyphosphoric acid, a macromolecular polymer having a saturated backbone with macromolecular modifications, sulfur, and an asphalt concrete. Polyphosphoric acid can have the empirical formula $P_qH_rO_s$ in which q, r, and s are positive numbers such that q is greater or equal to 2 and preferably ranges from 3 to 20. Any linear compound of the empirical formula $P_qH_{q+2}O_{3q+1}$ or polyphosphoric acids that can be polycondensation products formed from heating of meta-phosphoric acid can be used in embodiments of the present invention. In an aspect, the sulfur can be elemental sulfur or any form whether in powder form, slurry, or crystallized in the orthorhombic form. In an aspect, the asphalt concrete includes aggregate and bitumen.

The amounts of each component contained within the asphalt concrete composition can be varied. The polyphosphoric acid can be present in an amount effective to increase the high temperature stiffness. The macromolecular polymer can be present in an amount effective to increase viscosity of the composition so that it can be used in warm mix applications. Any polymer with a saturated hydrocarbon backbone, with or without reactive functionality can be used in embodiments of the present invention. Polymers formed from the monomers of ethylene, propylene, acrylate, butyacrylates, butylenes, hexenes, octenes, acrylate, butyacrylates, butylenes, etc.; long chain branched polyolefins with octenes; polyolefins graft or/or block/or diblock/or triblock polymers with maleic anhydride, fumarate and maleate esters, (meth) acrylate esters [e.g. glycidyl methacrylate and hydroxethyl methacrylate] and (meth)acrylic acid; polyolefin elastomers containing reactive p-methylstyrene groups, such as poly(isobutylene-co-p-methylstyrene)elastomers; or combinations thereof can be used in embodiments of the present invention. The sulfur can be present in an amount effective to at least partially emulsify in the composition.

As another embodiment of the present invention, a highly loaded sulfur-modified asphalt binder composition for use with asphalt concrete for improved properties relative to high temperature rotational viscosity without a reduction in dynamic shear properties is provided. In this embodiment, the binder includes a polyphosphoric acid, a macromolecular polymer having a saturated backbone with macromolecular modifications, and sulfur. In an aspect, the sulfur can be elemental sulfur or any form whether in powder form, slurry, or crystallized in the orthorhombic form. The binder of the present invention is a performance grade binder with high loading sulfur polymer modified asphalt that has low rotational viscosity.

The amounts of the components of the asphalt composition and the binder composition can vary. For example, the polyphosphoric acid is present in a range of about 0 wt. % to about 2.0 wt. % to provide increased high temperature stiffness. As another example, the macromolecular polymer having a saturated backbone with macromolecular modifications is present in a range of about 0 wt. % to about 5 wt. % to increase viscosity of the binder. The sulfur is present in an amount effective to at least partially emulsify in the composition. In an aspect, the sulfur is present in loadings ranging from about 20 wt. % to about 50 wt. %. When there is asphalt concrete present, the asphalt concrete can be present in a range of about 50 wt. % to about 90 wt. %. Other suitable amounts of each component will be apparent to those of skill in the art and are to be considered within the scope of the present invention.

The types of components used in embodiments of the present invention can be varied. For example, the types of macromolecular polymer having a saturated backbone with macromolecular modifications can vary. For example, the macromolecular polymer having a saturated backbone with macromolecular modifications can include any polymer with a saturated hydrocarbon backbone, with or without reactive functionality can be used in embodiments of the present invention. Polymers formed from the monomers of ethylene, propylene, acrylate, butyacrylates, butylenes, hexenes, octenes, acrylate, butyacrylates, butylenes, etc.; long chain branched polyolefins with octenes; polyolefins graft or/or block/or diblock/or triblock polymers with maleic anhydride, fumarate and maleate esters, (meth)acrylate esters [e.g. glycidyl methacrylate and hydroxethyl methacrylate] and (meth)acrylic acid; polyolefin elastomers containing reactive p-methylstyrene groups, such as poly(isobutylene-co-p-methylstyrene) elastomers; or combinations thereof can be used in embodiments of the present invention. Other suitable types of polymers that can be used in the present invention will be apparent to those of skill in the art and are to be considered within the scope of the present invention.

Besides the compositional embodiments, methods of preparing the asphalt composition are also provided as embodiments of the present invention. In an embodiment, a method of preparing an asphalt concrete composition having high sulfur load with improved properties relative to high temperature rotational viscosity without a reduction in dynamic shear properties is provided.

In an embodiment, a binder composition is prepared that includes a polyphosphoric acid, a macromolecular polymer having a saturated backbone with macromolecular modifications, and sulfur. In an aspect, the sulfur can be elemental sulfur or any form whether in powder form, slurry, or crystallized in the orthorhombic form. The polyphosphoric acid is present in an amount effective to provide increased high temperature stiffness. The macromolecular polymer is present in an amount effective to increase viscosity of the composition so that it can be used in hot mix applications. The sulfur is present in an amount effective to at least partially emulsify in the composition. Once the binder has been prepared, it is combined with asphalt concrete to produce the asphalt concrete composition. As with other embodiments, the asphalt concrete includes aggregate and bitumen.

As indicated previously, sulfur has been explored to modify asphalt by others; however, sulfur-modified asphalt compositions have not able to be used as Performance Grade binders. The unreacted sulfur in the past attempts tended to cause embrittlement upon aging. Embodiments of the present invention include sulfur modified asphalt compositions that can perform as an asphalt binder in paving applications. The composition of the binder allows these materials to be performance graded and improves the grading of the asphalt over an unmodified control at both the high temperature and low temperature regions, which significantly enhances the both low and higher temperature applications of these materials in the pavement construction. The compositional embodiments of the present invention are compliant to Performance Grades of asphalts and improves the grading of the asphalt over an unmodified control at both the high temperature and low temperature regions. The binder compositions of the present invention can be used as a low cost alternative to polymer modified binders in asphalt pavement applications.

In an aspect, the compositions of the present invention are PG graded. The performance grade of the compositions of the present invention can vary depending upon the amounts of the components that are present in the compositions. For example, if the sulfur is present in an amount of about 20 wt. %, along with other appropriate components as will be understood by those of skill in the art, then the composition is PG graded as 64-34. An another example, if the sulfur is present in an amount of about 50 wt. %, along with other appropriate components as will be understood by those of skill in the art, then the composition is PG graded as 64-28. An another example if the elemental sulfur is present in an amount of about 20 wt. %, with asphalt, polyphosphoric acid, Elvaloy® polymer and Sasobit® wax can be PG graded as PG 70-28 or 76-22 depending upon the amount of components. Other components that can affect the PG grading can include the polyphosphoric acid, polymers with a saturated hydrocarbon backbone, suitable non-surfactant additives based on wax chemistry, and the like. As with other embodiments of the present invention, the polyphosphoric acid can have the empirical formula $P_qH_rO_s$ in which q, r, and s are positive numbers such that q is greater or equal to 2 and preferably ranges from 3 to 20. Any linear compound of the empirical formula $P_qH_{q+2}O_{3q+1}$ or polyphosphoric acids that can be polycondensation products formed from heating of metaphosphoric acid can be used in embodiments of the present invention. The polymers with a saturated hydrocarbon backbone can include polymers formed from the monomers of ethylene, propylene, acrylate, butyacrylates, butylenes, hexenes, octenes, acrylate, butyacrylates, butylenes, etc.; long chain branched polyolefins with octenes; polyolefins graft or/or block/or diblock/or triblock polymers with maleic anhydride, fumarate and maleate esters, (meth)acrylate esters [e.g. glycidyl methacrylate and hydroxethyl methacrylate] and (meth)acrylic acid; polyolefin elastomers containing reactive p-methylstyrene groups, such as poly(isobutylene-co-p-methylstyrene)elastomers; or combinations thereof can be used in embodiments of the present invention. The non-surfactant additives based on wax chemistry can include Sasobit® wax, Fischer-Tropsch wax, ceresin wax, montan wax, wax extracted from lignite and brown coal, Ozocerite that is found in lignite beds, peat wax, paraffin wax, microcrystalline wax, Petroleum jelly. non-paraffin wax, natural wax. carnuba wax, bees wax, candelilla wax, shellac wax, castor wax, rice wax, modified natural wax. partial synthetic wax, polyethylene wax that is based on polyethylene, chemically modified wax, esterified chemically modified wax, saponified chemically modified wax, substituted amide waxes, polymerized α-olefins waxes, synthetic wax, or combinations thereof. Other suitable components will be apparent to those of skill in the art and are to be considered within the scope of the present invention.

The components contained in compositions of the present invention provide the compositions with good physical properties, particularly when compared with conventional asphalt compositions. For example, in an aspect, the compositions of the present invention have a dynamic shear of less than about 5,000 kPa at the intermediate temperature. Besides the dynamic shear, the rotation viscosity is also reduced as a result of the components contained in the compositions of the present invention. In an aspect, the composition has a rotational viscosity in a range of about 0.150 Pa·s to about 0.700 Pa·s at 135° C.

In an aspect, elemental sulfur was added to asphalt compositions containing polyphosphoric acid and saturated macromolecules with macromolecular modification (block copolymer, ter-polymer, graft-block co or ter-polymer (random, alternating, block, graft-block that can contain reactive functionality) with the resulting binder having superior properties in many areas. Several of the resulting prepared compositions in accordance with embodiments of the present invention were found to have unexpected results. For example, the compositions of the present invention showed remarkably improved low temperature performance of the binder. Based on the limiting stiffness temperatures obtained on the bending beam rheometer testing improved the low temperature of the Performance Grade 64-22 Asphalt control by six degrees of one grade on the low temperature. The addition of the sulfur under high shear also dramatically reduced the high temperature viscosity of the modified binder, which makes it possible to process at low temperatures, such as in warm mix applications.

Another expected result was that the reaction of PPA, elemental sulfur and macromolecular polymer having a saturated backbone with macromolecular modifications (e.g., Elvaloy® polymer) reduced the limiting fatigue related temperature by five degrees, which is equivalent to a grade and half improvement in this parameter.

The literature has claimed that sulfur can become embrittled during aging. The contrary was observed in the compositions made in accordance with embodiments of the present invention. The sulfur modified compound formulations of the present invention unexpectedly showed better properties after PAV (Pressure aging Vessel) aging (lower $G^*$–sin δ) for a given temperature. PAV aging data of the sulfur modified Asphalt formulation showed a value of 5,390 kPa at 16° C. versus the non-sulfur modified binder which displayed a value of 6,680 kPa at 16° C., which is statistically higher.

An another unexpected result, it was expected that hydrogen sulfide ($H_2S$) emissions from the compositions made in accordance with embodiments of the present invention would be the same as other PPA modified asphalt compositions. The $H_2S$ emissions from the compositions of the present invention were lower for Elvaloy® polymer modified sulfur asphalt compositions than prior art PPA-modified compositions.

The compositions and methods of the present invention provide a way to make a better performing asphalt binder, particularly with respect to low temperature and high temperature viscosities, utilizing sulfur, which is generally much less expensive than asphalt. When using the compositions and methods of the present invention, the low temperature properties of asphalt are improved without additional amounts of polymer, extender oils, or more expensive asphalts.

Example 1

In Experiment A, base PG 64-22 asphalt modified with 1.5 wt. % Elvaloy® polymer and 0.5 wt. % 115% PPA was compared to the same blend with the addition of 20 wt. % sulfur. The addition of sulfur into this compound provided several unique attributes that could not be obtained economically by other methods.

The base PG 64-22 with 0.5 wt. % PPA and 1.5 wt. % Elvaloy® polymer produced a binder with a PG 70-22 with an effective temperature range of 74.0-27.5 (Table 1). This base binder also displayed a high Rotational Viscosity of 1.563 Pa-sec. When this compound was made by blending 20 wt. % sulfur under high shear into the blend and then subsequently modifying, enhanced performance is observed both at the processing temperature and low temperatures. The sulfur modified binder displayed a 62% reduction in rotational viscosity at 135° C., while improving the effective temperature range to 73.2-30.3 for a PG 70-28 binder (Table 2). Significantly lower rotational viscosity at 135° C. offers the superior processing performance.

The results of Experiment A are significant because a binder graded this way typically requires the use of a high percentage of polymer >4 wt. % and the use of a very soft base asphalt to maintain the low temperature properties. In this experiment, there is a synergistic reaction between the PPA and sulfur that provides the additional improvement at the low end, while reducing the high temperature rotational viscosity. This technology can lend itself to using modified asphalts in warm mix applications, where it is currently limited by the high viscosity of modified binders. Furthermore, using the binder compositions in accordance with embodiments of the present invention in warm mix applications further reduces the possible emissions of $H_2S$.

The literature has claimed that sulfur can produce embrittlement during aging. The sulfur modified compound formulations showed better properties after PAV aging (lower $G^*$–Sin Delta) for a given temperature. The sulfur compound displayed a value of 5,390 kPa at 16° C. versus the non-sulfur modified binder that displayed a value of 6,680 kPa at 16° C., which is statistically higher. It is believed that this observed difference is also related to the synergistic effect between PPA and the sulfur.

TABLE 1

PG Determination for Binder A40, (PG 64-22, w/1.5% Elvaloy RET & 0.5% 115% PPA)

| PROPERTY | | AASHTO TEST METHOD | SPECIFICATIONS | RESULTS | | |
|---|---|---|---|---|---|---|
| ORIGINAL BINDER | | | | | | |
| Specific Gravity | 15.6° C. | T 228 | Report | 1.034 | | |
| Softening Point, ° C. (° F.) | | ASTM D 36 | Report | 63 (145) | | |
| Penetration (100 grams, 5 sec.), dmm | 25° C. | T 49 | Report | 71 | | |
| Viscosity, Pa · s | 135° C. | T 316 | 3.0 max. | 1.563 | | |
| | 165° C. | | Report | 0.320 | | |
| Separation, R&B Difference, 48 hrs., ° C. (° F.) | 163° C. | | | | | |
| Top, ⅓, Softening Point, ° C. (° F.) | | ASTM D 5892 | Report | 60.6 (141.0) | | |
| Bottom, ⅓, Softening Point, ° C. (° F.) | | | | 60.3 (140.5) | | |
| Difference, ° C. (° F.) | | | 2 (4) max. | 0.3 (0.5) | | |
| | | | | $G^*$ | $\delta$ | $G^*/\sin\delta$ |
| Dynamic Shear ($G^*/\sin\delta$, | 64° C. | T 315 | 1.0 min. | 3.620 | 64.6 | 4.010 |
| 10 rad./sec.), kPa | 82° C. | | | 0.760 | 69.3 | 0.813 |
| AFTER RTFOT @ 135° C. | | | | | | |
| Mass Change, % (Mass Loss is reported as Negative) | | T 240 | 1.0 max. | −0.023 | | |
| | | | | $G^*$ | $\delta$ | $G^*/\sin\delta$ |
| Dynamic Shear ($G^*/\sin\delta$, | 70° C. | T 315 | 2.2 min. | 2.740 | 62.4 | 3.090 |
| 10 rad./sec.), kPa | 76° C. | | | 1.650 | 63.5 | 1.850 |
| MSCR  0.1 kPa  % Rec. | 64° C. | TP 70-08 | Report | 65.3 | | |
| Jnr | | | | 0.30 | | |
| 3.2 kPa  % Rec. | | | | 62.1 | | |
| Jnr | | | | 0.31 | | |
| PRESSURE AGING RESIDUE (100° C., 300 psi, 20 hr.) | | R 28 | | | | |
| | | | | $G^*$ | $\delta$ | $G^* \cdot \sin\delta$ |
| Dynamic Shear ($G^* \cdot \sin\delta$, | 16° C. | T 315 | Report | 9,660 | 43.8 | 6,680 |
| 10 rad./sec.), kPa | 28° C. | | 5,000 max. | 1,560 | 53.8 | 1,260 |
| Creep Stiffness  Stiffness, MPa (60 sec.) | −12° C. | T 313 | 300 max. | 136 | | |
| m Value | | | 0.300 min. | 0.373 | | |
| Stiffness, MPa (60 sec.) | −18° C. | | 300 max. | 322 | | |
| m Value | | | 0.300 min. | 0.302 | | |
| 'True' Performance Grade | | | | 74.0-27.5 | | |
| AASHTO M 320 SUPERPAVE ™ Binder Grade, PG: | | | | PG 70-22 | | |

TABLE 2

PG Determination for Binder A41, (PG 64-22, w/1.5% Elvaloy RET & 0.5% PPA & 20 Wt. % Sulfur)

| PROPERTY | | AASHTO TEST METHOD | SPECIFICATIONS | RESULTS | | |
|---|---|---|---|---|---|---|
| ORIGINAL BINDER | | | | | | |
| H₂S Emissions, ppm | | Detector Tubes | Report | 5 ppm Before, 40 ppm After | | |
| Specific Gravity | 15.6° C. | T 228 | Report | 1.118 | | |
| Softening Point, ° C. (° F.) | | ASTM D 36 | Report | 60 (140) | | |
| Penetration (100 grams, 5 sec.), dmm | 25° C. | T 49 | Report | 82 | | |
| Viscosity, Pa · s | 135° C. | T 316 | 3.0 max. | 0.593 | | |
| | | | | $G^*$ | $\delta$ | $G^*/\sin\delta$ |
| Dynamic Shear ($G^*/\sin\delta$, | 70° C. | T 315 | 1.0 min. | 1.230 | 64.7 | 1.360 |
| 10 rad./sec.), kPa | 76° C. | | | 0.710 | 67.5 | 0.769 |

TABLE 2-continued

PG Determination for Binder A41, (PG 64-22, w/1.5% Elvaloy RET & 0.5% PPA & 20 Wt. % Sulfur)

| PROPERTY | | | AASHTO TEST METHOD | SPECIFICATIONS | RESULTS | | |
|---|---|---|---|---|---|---|---|
| AFTER RTFOT @ 135° C. | | | | | | | |
| Mass Change, % (Mass Loss is reported as Negative) | | | T 240 | 1.0 max. | −0.925 | | |
| | | | | | G* | δ | G*/sinδ |
| Dynamic Shear (G*/sinδ, 10 rad/sec.), kPa | | | 70° C. 76° C. 82° C. | T 315 | 2.2 min. | 3.820 2.210 1.210 | 63.6 65.9 69.1 | 4.260 2.420 1.300 |
| MSCR | 0.1 kPa | % Rec. Jnr | 64° C. | TP 70-08 | Report | 43.9 0.76 | | |
| | 3.2 kPa | % Rec. Jnr | | | | 20.3 1.24 | | |
| PRESSURE AGING RESIDUE (100° C., 300 psi, 20 hr.) | | | R 28 | | | | |
| | | | | | G* | δ | G* · sinδ |
| Dynamic Shear (G* · sinδ, 10 rad./sec.), kPa | | | 16° C. 25° C. | T 315 | Report 5,000 max. | 8,100 2,100 | 41.7 48.7 | 5,390 1,580 |
| Creep Stiffness | Stiffness, MPa (60 sec.) | | −18° C. | T 313 | 300 max. | 207 | | |
| | m Value | | | | 0.300 min. | 0.325 | | |
| | Stiffness, MPa (60 sec.) | | −24° C. | | 300 max. | 414 | | |
| | m Value | | | | 0.300 min. | 0.263 | | |
| 'True' Performance Grade | | | | | | 73.2-30.3 | | |
| AASHTO M 320 SUPERPAVE ™ Binder Grade, PG: | | | | | | 70-28 | | |

FIG. 1 shows time-temperature superposition the Log Modulus (G') versus the Log Reduced Frequency for the PG 64-22 sulfur series described in Example 1—Experiment A. The response in the low frequency range provides insight into the behavior of each system. There are significant differences in the low frequency region. The addition of the PPA did not provide a substantial increase due to the temperature in which the PPA was added. The Elvaloy® polymer/20 wt. % sulfur binder showed a large increase in modulus signifying network formation and possible reaction with the sulfur. The Elvaloy® polymer/PPA/20 wt. % sulfur binder showed the highest relative modulus values and was two orders of magnitude higher than the 20 wt % sulfur and 20 wt. % sulfur/PPA binders. The large increase is attributed to the reaction of the Elvaloy® polymer and PPA in the presence of sulfur, resulting in a binder which displayed different rheological properties. FIG. 1 shows the Log Modulus G' versus the Log Reduced Frequency for PG 6422 series of sulfur/PPA/Elvaloy® polymer modified binders.

Figure 2:
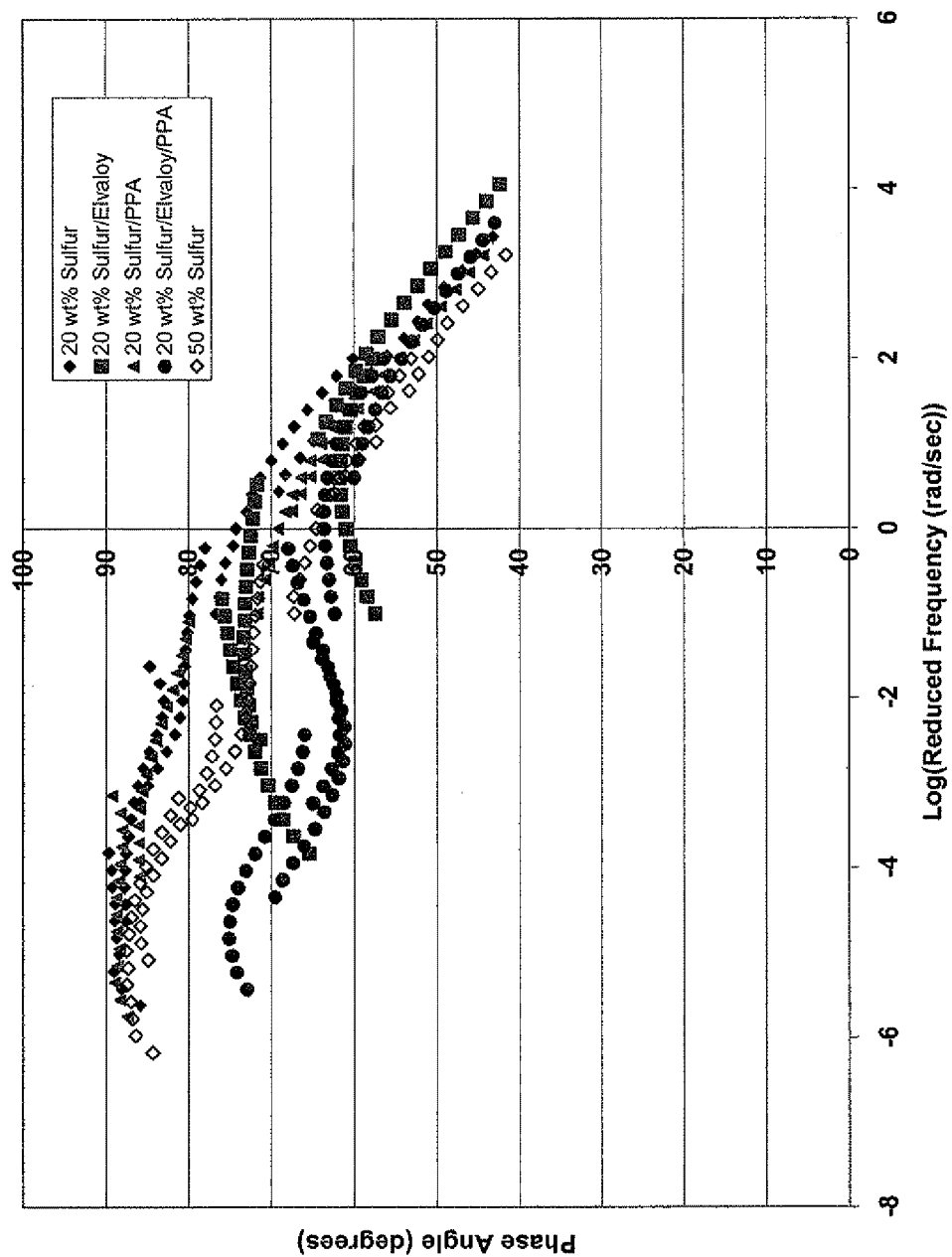
FIG. 2 is a graphical representation of phase angle versus the log reduced frequency for compositions with and without inclusion of a high sulfur load in accordance with embodiments of the present invention as described in Example 1.

FIG. 2 shows the Phase Angle versus the Log Reduced Frequency for PG 6422 series of sulfur/PPA/Elvaloy® polymer modified binders described in Example 1—Experiment A. The reference temperature for development of the master curve was 20° C. The 20 wt. % sulfur/Elvaloy® polymer and 20 wt. % sulfur/Elvaloy/PPA showed the lowest phase angles at the low frequencies. These results of lower phase angle relates to a more elastic response. These rheological responses at lower frequencies clearly show presence of elastomeric dynamic networks in Asphalt indicating the improvement in the Asphalt binder long term properties. Also MSCR (multiple Stress creep recovery) test for PG Determination for Binder (PG 64-22, +1.5 wt. % Elvaloy® polymer+w/0.5% 115% PPA+20 Wt. % Sulfur) shows that the sulfur in the binder produced some three dimensional elastic structure which is evident from the 20.3% Recovery at 3.2 kPa.

Example 2

In Experiment B, base PG 64-28 asphalt modified with 0.5 wt. % 115% PPA was compared to the same blend with the addition of 20 wt. % sulfur. The addition of sulfur into this compound provided several unique attributes that could not be obtain economically by other methods.

The base PG 64-28 with 0.5 wt. % PPA produced a binder with a PG 64-28 with an effective temperature range of 69.2-3.1.4, as shown in Table 3. This binder also displayed a Rotational Viscosity of 0.745 Pa-sec. When the same compound was made, but with blending 20 wt. % sulfur under high shear into the blend and then subsequently modifying, enhanced performance was observed both at the processing temperature and low temperatures. The sulfur modified binder displayed a 64% reduction in rotational viscosity at 135° C., while improving the effective temperature range to 65.9-34.3 for a PG 64-34 binder, as shown in Table 4.

The results shown in Table 4 are significant because a binder with this grading typically requires the use of a high percentage of polymer >4 wt. % and the use of a very soft base asphalt to maintain the low temperature properties. In Experiment B, there is a synergistic reaction between the PPA and sulfur, which provides the addition improvement at the low end, while reducing the high temperature rotational viscosity. This technology can lend itself to using modified asphalts in warm mix applications, where it is currently limited by the high viscosity of modified binders. Furthermore, using these types of binder compositions made in accordance with embodiments of the present invention in warm mix applications further reduces the possible emissions of $H_2S$.

As indicated previously, the literature has claimed that sulfur can produce embrittlement during aging. The sulfur modified compound showed better properties after PAV aging (lower G*−sin δ) for a given temperature. The sulfur compound displayed a value of 3,370 kPa at 19° C. versus the non-sulfur modified binder which displayed a value of 4,170 kPa at 19° C. There is a synergistic reaction between the sulfur and the PPA.

Example 3

Addition of 50 wt. % sulfur to PG 6428 results in a binder graded as PG 64-10 due to the high PAV DSR values. This binder shows a significant increase in stiffness at the lower temperatures after aging. However, a base PG 64-28 asphalt modified with 0.5 wt. % 115% PPA and 50 wt. % sulfur results in a performance graded PG 6428. The addition of sulfur into this compound provided several unique attributes that could not be obtain economically by other methods.

The base PG 64-28 with 0.5 wt. % PPA produced a binder with a PG 64-28 with an effective temperature range of 69.2-31.4, as shown in Table 3. This binder also displayed a Rotational Viscosity of 0.745 Pa-sec. This binder also displayed a high Rotational Viscosity of 1.593 Pa-sec. When this formulation was made by blending 50 wt. % sulfur under high shear into the blend and then subsequently modifying, enhanced performance was observed with a 53% reduction in rotational viscosity at 135° C., while improving the effective temperature range to 69.1-30.0 for a PG 64-28 binder, as shown in Table 5.

TABLE 3

PG Determination of Binder B20, (PG 64-28 w/0.5% 115% PPA)

| PROPERTY | | | AASHTO TEST METHOD | SPECIFICATIONS | RESULTS | | |
|---|---|---|---|---|---|---|---|
| ORIGINAL BINDER | | | | | | | |
| Flash Point, ° C. (° F.) | | | T 48 | 230 min. | 273 (524) | | |
| Specific Gravity | | 15.6° C. | T 228 | Report | 1.034 | | |
| Softening Point, ° C. (° F.) | | | ASTM D 36 | Report | 57 (135) | | |
| Penetration (100 grams, 5 sec.), dmm | | 25° C. | T 49 | Report | 67 | | |
| Viscosity, Pa · s | | 135° C. | T 316 | 3.0 max. | 0.745 | | |
| | | 165° C. | | Report | 0.179 | | |
| | | | | | G* | δ | G*/sin δ |
| Dynamic Shear (G*/sin δ, 10 rad./sec.), kPa | | | T 315 | 1.0 min. | | | |
| | | | | | G* | δ | G*/sin δ |
| Dynamic Shear (G*/sinδ, 10 rad./sec.), kPa | | 64° C. | T 315 | 2.2 min. | 3.990 | 74.0 | 4.150 |
| | | 70° C. | | | 2.060 | 76.6 | 2.120 |
| MSCR | 0.1 kPa | % Rec. | 64° C. | TP 70-08 | Report | 27.5 | |
| | | Jnr | | | | 1.00 | |
| | 3.2 kPa | % Rec. | | | | 7.05 | |
| | | Jnr | | | | 1.49 | |
| PRESSURE AGING RESIDUE (100° C., 300 psi, 20 hr.) | | | R 28 | | | | |
| | | | | | G* | δ | G* · sin δ |
| Dynamic Shear (G* · sinδ, 10 rad./sec.), kPa | | 16° C. | T 315 | Report | 8,270 | 42.7 | 5,610 |
| | | 19° C. | | 5,000 max. | 5,410 | 44.8 | 3,810 |
| | | 22° C. | | | 3,460 | 46.8 | 2,520 |
| Creep Stiffness | Stiffness, MPa (60 sec.) | | −18° C. | T 313 | 300 max. | 203 | |
| | m Value | | | | 0.300 min. | 0.364 | |
| | Stiffness, MPa (60 sec.) | | −24° C. | | 300 max. | 405 | |
| | m Value | | | | 0.300 min. | 0.281 | |
| 'True' Performance Grade | | | | | 69.7-31.4 | | |
| AASHTO M 320 SUPERPAVE ™ Binder Grade, PG: | | | | | 64-28 | | |

TABLE 4

PG Determination for Binder B21, (PG 64-28, w/ 0.5% 115% PPA & 20 Wt. % Sulfur)

| PROPERTY | | AASHTO TEST METHOD | SPECIFICATIONS | RESULTS |
|---|---|---|---|---|
| ORIGINAL BINDER | | | | |
| H₂S Emissions, ppm | | Detector Tubes | Report | 0 ppm Before, 80 ppm After |
| Specific Gravity | 15.6° C. | T 228 | Report | 1.135 |
| Softening Point, ° C. (° F.) | | ASTM D 36 | Report | 50 (122) |

TABLE 4-continued

PG Determination for Binder B21, (PG 64-28, w/ 0.5% 115% PPA & 20 Wt. % Sulfur)

| PROPERTY | | | AASHTO TEST METHOD | SPECIFICATIONS | | RESULTS | |
|---|---|---|---|---|---|---|---|
| Penetration (100 grams, 5 sec.), dmm | | 25° C. | T 49 | Report | | 126 | |
| Viscosity, Pa · s | | 135° C. | T 316 | 3.0 max. | | 0.272 | |
| | | | | | $G^*$ | $\delta$ | $G^*/\sin\delta$ |
| Dynamic Shear ($G^*/\sin\delta$, | | 64° C. | T 315 | 1.0 min. | 1.320 | 75.9 | 1.360 |
| 10 rad./sec.), kPa | | 70° C. | | | 0.663 | 79.5 | 0.675 |
| | | | AFTER RTFOT @ 135° C. | | | | |
| Mass Change, % (Mass Loss is reported as Negative) | | | T 240 | 1.0 max. | | −0.888 | |
| | | | | | $G^*$ | $\delta$ | $G^*/\sin\delta$ |
| Dynamic Shear ($G^*/\sin\delta$, 10 rad./ | | 64° C. | T 315 | 2.2 min. | 2.520 | 73.6 | 2.620 |
| sec.), kPa | | 70° C. | | | 1.470 | 77.4 | 1.510 |
| MSCR | 0.1 kPa | % Rec. | 64° C. | TP 70-08 | Report | | 16.3 |
| | | Jnr | | | | | 3.29 |
| | 3.2 kPa | % Rec. | | | | | 1.9 |
| | | Jnr | | | | | 5.86 |
| PRESSURE AGING RESIDUE (100° C., 300 psi, 20 hr.) | | | R 28 | | | | |
| | | | | | $G^*$ | $\delta$ | $G^* \cdot \sin\delta$ |
| Dynamic Shear ($G^* \cdot \sin\delta$, 10 rad./ | | 16° C. | T 315 | Report | 7,610 | 42.0 | 5,100 |
| sec.), kPa | | 19° C. | | 5,000 max. | 4,820 | 44.3 | 3,370 |
| Creep Stiffness | Stiffness, MPa | −18° C. | T 313 | 300 max. | | 141 | |
| | (60 sec.) | | | | | | |
| | m Value | | | 0.300 min. | | 0.360 | |
| | Stiffness, MPa | −24° C. | | 300 max. | | 289 | |
| | (60 sec.) | | | | | | |
| | m Value | | | 0.300 min. | | 0.319 | |
| 'True' Performance Grade | | | | | | 65.9-34.3 | |
| AASHTO M 320 SUPERPAVE ™ Binder Grade, PG: | | | | | | 64-34 | |

This is significant because a binder graded this way typically requires the use of a high percentage of polymer >4 wt. % and the use of a very soft base asphalt to maintain the low temperature properties. In this case there is a synergistic reaction between the PPA and sulfur which provides the addition improvement at the low end, while reducing the high temperature rotational viscosity. This technology can lend itself to using modified asphalts in Warm Mix Applications, where it is currently limited by the high viscosity of modified binders. Also, using these types of binders in Warm Mix applications would further reduce the possible emissions of $H_2S$. Also MSCR (multiple Stress creep recovery) test for PG Determination for Binder B22, (PG 64-28, w/0.5% 115% PPA & 50 Wt. % Sulfur) shows that the sulfur in the binder produced some three dimensional elastic structure which is evident from the 16.3% Recovery at 0.1 kPa.

TABLE 5

PG Determination for Binder B12, (PG 64-28, w/50 Wt. % Sulfur)

| PROPERTY | | AASHTO TEST METHOD | SPECIFICATIONS | RESULTS | | |
|---|---|---|---|---|---|---|
| | | ORIGINAL BINDER | | | | |
| $H_2S$ Emissions, ppm | | Detector Tubes | Report | After 92 ppm | | |
| Specific Gravity | 15.6° C. | T 228 | Report | 1.204 | | |
| Softening Point, ° C. (° F.) | | ASTM D 36 | Report | 56 (133) | | |
| Penetration (100 grams, 5 sec.), dmm | 25° C. | T 49 | Report | 46 | | |
| Viscosity, Pa · s | 135° C. | T 316 | 3.0 max. | | 0.228 | |
| | | | | $G^*$ | $\delta$ | $G^*/\sin\delta$ |
| Dynamic Shear ($G^*/\sin\delta$, | 64° C. | T 315 | 1.0 min. | 1.130 | 85.8 | 1.130 |
| 10 rad./sec.), kPa | 70° C. | | | 0.556 | 87.3 | 0.557 |

TABLE 5-continued

PG Determination for Binder B12, (PG 64-28, w/50 Wt. % Sulfur)

| PROPERTY | | AASHTO TEST METHOD | SPECIFICATIONS | RESULTS | | |
|---|---|---|---|---|---|---|
| AFTER RTFOT @ 135° C. | | | | | | |
| Mass Change, % (Mass Loss is reported as Negative) | | T 240 | 1.0 max. | −0.813 | | |
| | | | | G* | δ | G*/sin δ |
| Dynamic Shear (G*/sinδ, 10 rad./sec.), kPa | 70° C. 76° C. | T 315 | 2.2 min. | 2.740 1.460 | 83.9 85.6 | 2.760 1.460 |
| MSCR  0.1 kPa  % Rec. Jnr | 64° C. | TP 70-08 | Report | | 23.2 0.36 | |
| 3.2 kPa  % Rec. Jnr | | | | | 4.1 0.43 | |
| PRESSURE AGING RESIDUE (100° C.) | | R 28 | | | | |

TABLE 6

PG Determination for Binder B22, (PG 64-28, w/ 0.5% 115% PPA & 50 Wt. % Sulfur)

| PROPERTY | | AASHTO TEST METHOD | SPECIFICATIONS | RESULTS | | |
|---|---|---|---|---|---|---|
| ORIGINAL BINDER | | | | | | |
| H₂S Emissions, ppm | | Detector Tubes | Report | After 35 ppm | | |
| Specific Gravity | 15.6° C. | T 228 | Report | 1.203 | | |
| Softening Point, °C. (°F.) | | ASTM D 36 | Report | 68 (154) | | |
| Penetration (100 grams, 5 sec.), dmm | 25° C. | T 49 | Report | 33 | | |
| Viscosity, Pa · s | 135° C. | T 316 | 3.0 max. | 0.350 | | |
| | | | | G* | δ | G*/sinδ |
| Dynamic Shear (G*/sinδ, 10 rad./sec.), kPa | 64° C. 70° C. | T 315 | 1.0 min. | 1.680 0.878 | 73.1 76.0 | 1.760 0.905 |
| AFTER RTFOT @ 135° C. | | | | | | |
| Mass Change, % (Mass Loss is reported as Negative) | | T 240 | 1.0 max. | −0.822 | | |
| | | | | G* | δ | G*/sinδ |
| Dynamic Shear (G*/sinδ, 10 rad./sec.), kPa | 76° C. 82° C. | T 315 | 2.2 min. | 3.300 1.670 | 76 79.1 | 3.400 1.700 |
| MSCR  0.1 kPa  % Rec. Jnr | 64° C. | TP 70-08 | Report | | 53.2 0.03 | |
| 3.2 kPa  % Rec. Jnr | | | | | 16.4 0.11 | |
| PRESSURE AGING RESIDUE (100° C., 300 psi, 20 hr.) | | R 28 | | | | |
| | | | | G* | δ | G* · sinδ |
| Dynamic Shear (G* · sinδ, 10 rad./sec.), kPa | 19° C. 22° C. | T 315 | Report 5,000 max. | 11,500 8,120 | 36.4 37.8 | 6,830 4,980 |
| Creep Stiffness  Stiffness, MPa (60 sec.) | −18° C. | T 313 | 300 max. | | 86 | |
| m Value | | | 0.300 min. | | 0.321 | |
| Stiffness, MPa (60 sec.) | −24° C. | | 300 max. | | 266 | |
| m Value | | | 0.300 min. | | 0.262 | |
| 'True' Performance Grade | | | | | 69.1-30.0 | |
| AASHTO M 320 SUPERPAVE ™ Binder Grade, PG: | | | | | 64-28 | |

Figure 3:
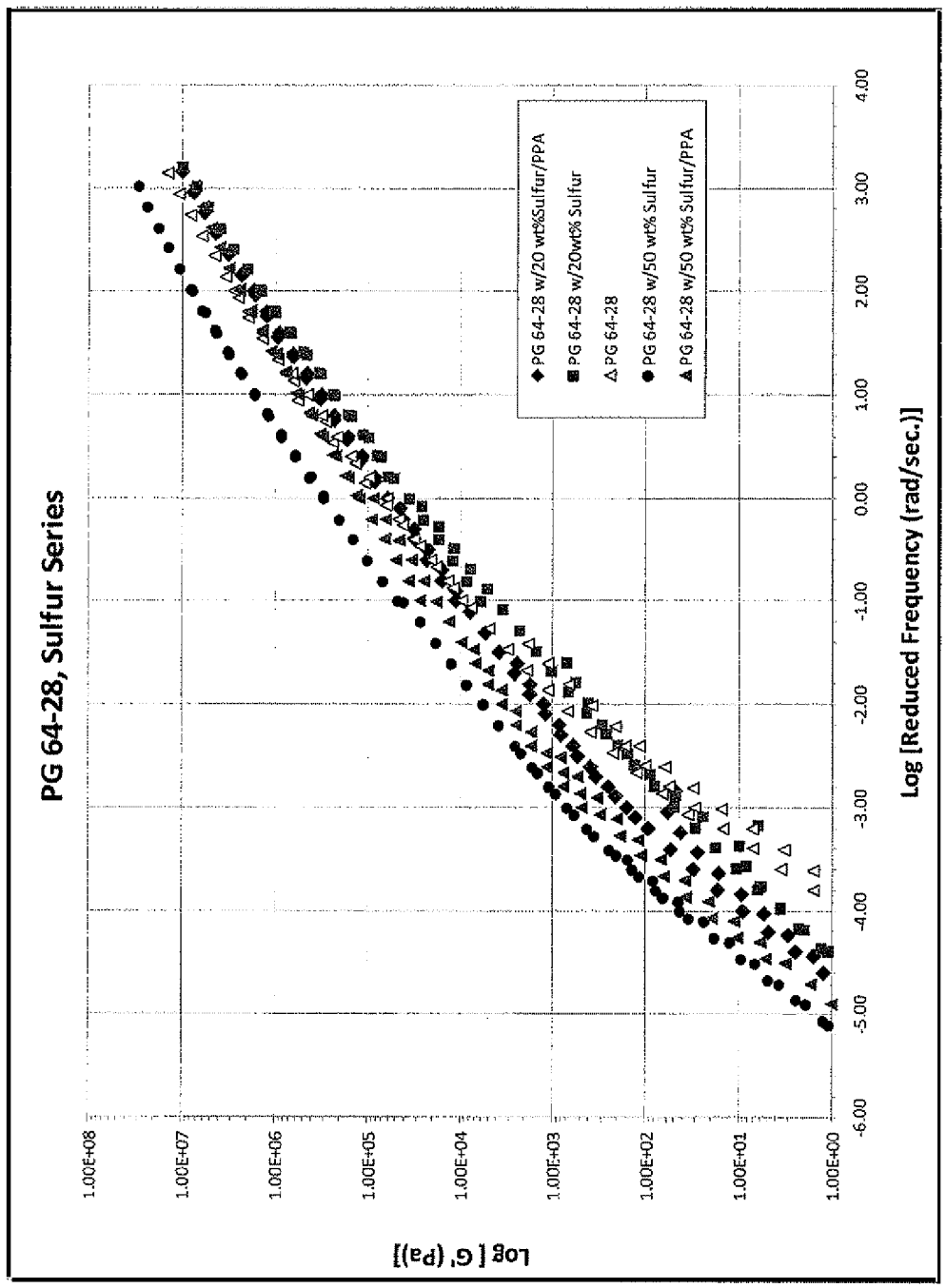
FIG. 3 is a graphical representation of a time-temperature superposition of the log modulus (G') versus the log reduced frequency comparing a composition with and without inclusion of a high sulfur load in accordance with embodiments of the present invention as described in Example 2.
Figure 4:
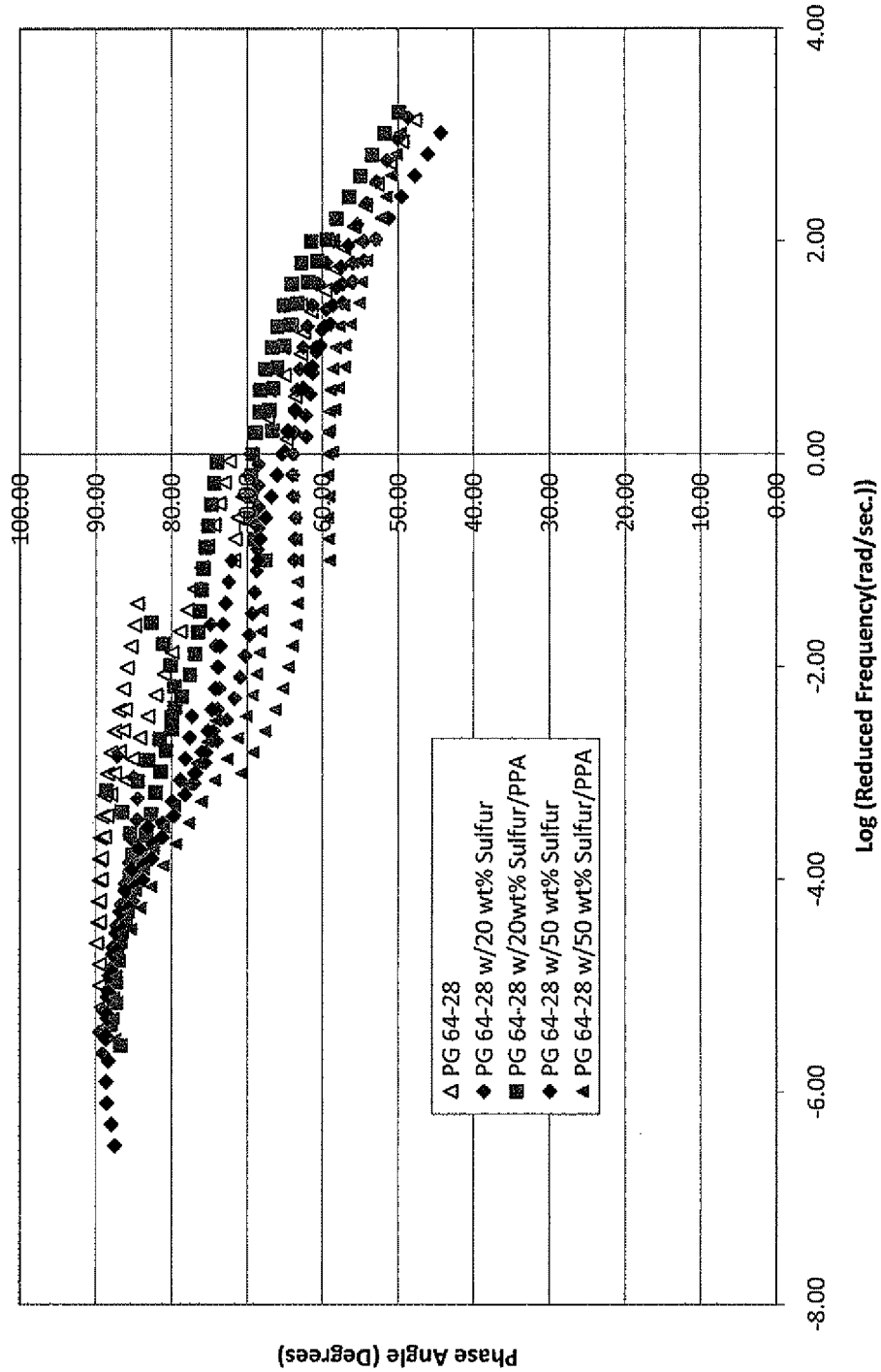
FIG. 4 is a graphical representation of phase angle versus the log reduced frequency for compositions with and without inclusion of a high sulfur load in accordance with embodiments of the present invention as described in Example 2.

FIG. 3 shows the Log Modulus G' versus the Log Reduced Frequency for PG 6428 series of sulfur/PPA modified binders as described in Example 2. FIG. 4 shows the Phase Angle versus the Log Reduced Frequency for PG 6428 series of sulfur/PPA modified binders as described in Example 2. The reference temperature for development of the master curve was 20° C. The 50 wt. % sulfur/PPA showed the lowest phase angles at the low frequencies. These results indicate strong network formation versus the other systems. A lower phase angle relates to a more elastic response. These rheological responses at lower frequencies clearly show presence of elastomeric dynamic networks in Asphalt indicating the improvement in the Asphalt binder long term properties. The MSCR (multiple Stress creep recovery) test for PG Determination for Binder (PG 64-28, +w/0.5% 115% PPA+50 Wt. % Sulfur) shows that the sulfur in the binder produced some three dimensional elastic structure which is evident from the 16.4% Recovery at 3.2 kPa.

Several advantages exist when using the compositions and methods of the present invention compared with conventional asphalt binders and compositions. As an advantage of the present invention, the experimental results show that sulfur modified asphalt compositions in accordance with embodiments of the present invention can be Performance Graded and may be able to be utilized in place of some of the higher performing polymer modified systems at a much lower cost.

As another advantage of the present invention, significantly improved low temperature performance of macromolecular modified asphalt binders was observed, which allows the compositions of the present invention to be used in lower application temperatures compared with conventional asphalt compositions.

Using the compositions and methods of the present invention provides a way to make a better performing asphalt binder (low temperature, low high temperature viscosity) using sulfur which is much less expensive than asphalt. Using the compositions and methods of the present invention also provides a way to improve the low temperature properties of asphalts which does not require addition of a lot of polymer and use of extender oils or more expensive asphalts.

As indicated previously, the unreacted sulfur in prior art asphalt compositions tended to cause embrittlement upon aging and the earlier reported sulfur extended asphalt binder materials were not allowed to be Performance Graded. On the contrary, the sulfur modified compound formulations made in accordance with embodiments of the present invention show better properties after PAV aging (lower G*−sin δ) for a given temperature. The sulfur modified Asphalt formulation displayed a value of 5,390 kPa at 16° C. versus the non-sulfur modified binder which displayed a value of 6,680 kPa at 16° C.

The addition of sulfur in these types of compositions under high shear where the sulfur can basically emulsify to some degree in the asphalt.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. An asphalt concrete composition having high sulfur load with improved properties relative to high temperature rotational viscosity without a reduction in dynamic shear properties, the asphalt concrete composition comprising:
    a binder comprising:
        a polyphosphoric acid, the polyphosphoric acid being present in an amount effective to provide high temperature stiffness for the composition;
        a polymer having a saturated backbone with macromolecular modifications, the polymer being present in an amount effective to provide sufficient lubrication for the composition;
        sulfur being present in a range of from about 20 wt. % to about 50 wt. % of the binder; and
        asphalt; and
    an aggregate selected from the group consisting of coarse filler, fine filler, mineral filler, and combinations thereof.

2. The composition of claim 1, wherein the aggregate and the binder are present in a ratio of about 92 parts by weight of aggregate to about 5 parts by weight binder.

3. The composition of claim 1, wherein the binder is PG graded.

4. The composition of claim 1, wherein the pressure aging residue of the binder has a Dynamic Shear in a range of about 1,500 kPa to about 5,000 kPa at about 25° C.

5. The composition of claim 1, wherein the binder has a SUPERPAVE Performance Grade of 70-28.

6. The composition of claim 1, wherein the binder composition has a rotational viscosity in a range of about 0.150 Pa·s to about 0.700 Pa·s at about 135° C.

7. A highly loaded sulfur-modified asphalt binder composition for use with asphalt concrete for improved properties relative to high temperature rotational viscosity without a reduction in dynamic shear properties, the binder comprising:
    a polyphosphoric acid, the polyphosphoric acid is present in a range of from about 0 wt. % to about 2.0 wt. % of the binder;
    a polymer having a saturated backbone with macromolecular modifications, the polymer having a saturated backbone with macromolecular modifications being present in a range of from about 0 wt. % to about 5 wt. % of the binder;
    sulfur, the sulfur being present in a range of from about 20 wt. % to about 50 wt. % of the binder; and
    asphalt.

8. The composition of claim 7, wherein the polyphosphoric acid is selected from the group consisting of:
    an acid having a formula of $P_q H_r O_s$, wherein q, r, and s are positive numbers and q is greater than 2;
    an acid that is a linear compound having a formula of $P_q H_{q+2} O_{3q+1}$, wherein q is greater than 2;
    an acid that is a polycondensation product formed from heating metaphosphoric acid; and
    combinations thereof.

9. The composition of claim 7, wherein the sulfur is selected from the group consisting of elemental sulfur; sulfur in powder form; sulfur in slurry form; sulfur in crystallized orthorhombic form; and combinations thereof.

10. The composition of claim 7, wherein the composition is PG graded.

11. The composition of claim 7, wherein the pressure aging residue of the composition has a Dynamic Shear in a range of about 1,500 kPa to about 5,000 kPa at about 25° C.

12. The composition of claim 7, wherein the composition has a SUPERPAVE Performance Grade of 70-28.

13. The composition of claim 7, wherein the composition has a rotational viscosity in a range of about 0.150 Pa·s to about 0.700 Pa·s at about 135° C.

14. A method of preparing an asphalt concrete composition having high sulfur load with improved properties relative to high temperature rotational viscosity without a reduction in dynamic shear properties, the method comprising the steps of:
   a. preparing a binder comprising a polyphosphoric acid, a polymer having a saturated backbone with macromolecular modifications, asphalt and sulfur, the polyphosphoric acid being present in an amount effective to provide high temperature stiffness for the binder, the polymer being present in an amount effective to increase viscosity of the binder, and the elemental sulfur being present in a range of from about 20 wt. % to about 50 wt. % of the binder; and
   b. combining the binder with aggregate to produce the asphalt concrete composition.

15. The method of claim 14, wherein the polyphosphoric acid is present in a range of from about 0 wt. % to about 2.0 wt. % of the binder.

16. The method of claim 14, wherein the polymer having a saturated backbone with macromolecular modifications is present in a range of from about 0 wt. % to about 5 wt. % of the binder.

17. The method of claim 14 wherein the aggregate and the binder of the asphalt binder composition are present in a ratio of about 92 parts by weight of aggregate to about 5 parts by weight binder.

18. The method of claim 14, wherein the composition is PG graded.

19. The method of claim 14, wherein the pressure aging residue of the binder has a Dynamic Shear in a range of about 1,500 kPa to about 7,000 kPa at about 25° C.

20. The method of claim 14, wherein the binder has a SUPERPAVE Performance Grade of 70-28.

21. The method of claim 14, wherein the binder has a rotational viscosity in a range of about 0.150 Pa·s to about 0.700 Pa·s at about 135° C.

22. The composition of claim 1 where the binder has a "True" Performance Grade temperature range that is greater than about 100° C.

23. The composition of claim 1 where the binder has a "True" Performance Grade lower temperature value that is less than about −30° C.

24. The composition of claim 7 where the polymer having a saturated backbone with macromolecular modifications has reactive functionality.

25. The composition of claim 24 where the reactive functionality is selected from the group consisting of maleic anhydride, fumarate, maleate esters, (meth)acrylate esters, (meth) acrylic acid, and combinations thereof.

26. The composition of claim 24 where the polymer having a saturated backbone with macromolecular modifications is a polyolefin elastomer containing reactive p-methylstyrene groups.

27. The composition of claim 7 where the polymer having a saturated backbone with macromolecular modifications is formed from at least one monomer from the group consisting of ethylene, propylene, acrylate, butyacrylates, butylenes, hexenes, octenes and combinations thereof.

28. The composition of claim 27 where the polymer having a saturated backbone with macromolecular modifications includes a long chain branched polyolefin formed from octenes.

29. The composition of claim 7 where the polymer having a saturated backbone with macromolecular modifications is selected from the group consisting of a graft polymer, a diblock co-polymer, a triblock co-polymer, and combinations thereof.

30. The composition of claim 7 where the polymer having a saturated backbone with macromolecular modifications is a poly(isobutylene-co-p-methylstyrene)elastomer.

31. The composition of claim 7 where the binder has a "True" Performance Grade temperature range that is greater than about 100° C.

32. The composition of claim 7 where the binder has a "True" Performance Grade lower temperature value that is less than about −30° C.

33. The composition of claim 7 where the sulfur is present in an amount of about 20 wt. % and the composition has a SUPERPAVE Performance Grade of 76-22.

* * * * *